United States Patent [19]

Horada et al.

[11] Patent Number: 4,586,471
[45] Date of Patent: May 6, 1986

[54] FUEL CONTROL MECHANISM FOR INTERNAL COMBUSTION ENGINE

[75] Inventors: Osamu Horada, Chigasaki; Yasusuke Anda, Fujisawa, both of Japan

[73] Assignee: Isuzu Motors, Ltd., Japan

[21] Appl. No.: 678,018

[22] Filed: Dec. 4, 1984

[51] Int. Cl.⁴ ............................................... F02D 9/02
[52] U.S. Cl. ...................................... 123/399; 123/361
[58] Field of Search ............... 123/339, 352, 361, 399, 123/478, 350, 401, 360

[56] References Cited

U.S. PATENT DOCUMENTS

| | | | |
|---|---|---|---|
| 3,476,205 | 11/1969 | Kato ................................... | 123/361 X |
| 4,112,885 | 9/1978 | Iwata et al. ..................... | 123/361 X |
| 4,430,975 | 2/1984 | Ishida et al. ......................... | 123/399 |
| 4,455,978 | 6/1984 | Atago et al. ..................... | 123/361 X |
| 4,502,436 | 3/1985 | Bonfiglioli et al. ................. | 123/339 |

Primary Examiner—Tony M. Argenbright
Attorney, Agent, or Firm—John E. Toupal; Harold G. Jarcho

[57] ABSTRACT

An internal combustion engine fuel control system including a fuel supply means for controlling the supply of fuel to an internal combustion engine, a first operator mechanically coupled to the control means and operative to adjust the level of fuel supplied thereby, a second operator, and a coupling mechanically coupling the first and second operators so as to alternatively provide either common or independent movement thereof. A sensor detects the position of a manually controlled accelerator pedal for the engine and a control mechanism responsive to the sensor provides an output dependent upon the accelerator position sensed thereby. Responsive to the output of the control mechanism is a driver that produces movement of the second operator.

20 Claims, 4 Drawing Figures

FUEL CONTROL MECHANISM FOR INTERNAL COMBUSTION ENGINE

BACKGROUND OF THE INVENTION

This invention relates generally to a fuel control system for use in an internal combustion engine and, more particularly, to such a system which is functional independently of automatic choke and speed change mechanisms employed in the internal combustion engine.

Known are automatic speed change gears that automatically control conventional synchronous speed change gears in combination with a clutch mechanism. The automatic speed change gears are arranged typically such that a mechanical coupling between either a carburetor or a fuel injection pump is decoupled from an accelerator pedal and either a throttle valve or a control lever used as a fuel control device is driven by a stepping motor. Controlling the stepping motor is an electronic control unit that receives input signals both from a sensor that detects operation of the accelerator pedal and from a sensor that detects starting of the internal combustion engine and changes of speed thereof.

The fuel control device for the internal combustion engine that is controlled remotely as described above, is mechanically coupled to the stepping motor either directly or indirectly through a mechanical linkage. Such arrangements exhibit the following disadvantages. An automatic choke mechanism or a fuel increasing mechanism can not be employed generally to enhance starting of the internal combustion engine in cold weather. If they are used, the automatic choke mechanism or the fuel increasing mechanism can prevent proper functioning of the stepping motor. In addition, the throttle valve or fuel control valve cannot work properly as the accelerator pedal is pressed in normal driving.

It is an object of the present invention, therefore, to provide an improved fuel control system for use in an internal combustion engine.

SUMMARY OF THE INVENTION

The invention is an internal combustion engine fuel control system including a fuel supply means for controlling the supply of fuel to an internal combustion engine; a first operator mechanically coupled to the control means and operative to adjust the level of fuel supplied thereby, a second operator, and a coupling mechanically coupling the first and second operators so as to alternatively provide either common or independent movement thereof. A sensor detects the position of a manually controlled accelerator pedal for the engine and a control mechanism responsive to the sensor provides an output dependent upon the accelerator position sensed thereby. Responsive to the output of the control mechanism is a driver that produces movement of the second operator. The use of distinct first and second operators facilitates independent control of the fuel supply means.

According to one feature of the invention, the fuel supply means comprises a rotatable shaft, the first operator comprises a first lever having one end fixed to for rotation with the shaft, and the second operator comprises a second lever having one end coupled to an opposite end of the first lever by the coupling. This arrangement provides the desired function in a structurally simple form.

According to other features of the invention, the coupling is adapted to permit one sense of pivotal movement by the first lever independently of the second lever and to produce the movement of the first lever in response to pivotal movement of the one sense by the second lever, and the system includes bias means inducing pivotal movement of the first lever in a sense opposite the one sense. This arrangement permits the desired independent control of the operators.

According to still other features of the invention, the coupling comprises an abutment surface on the one end of the second lever, the abutment surface being shaped and arranged to engage the opposite end of the first lever in response to pivotal movement of the one sense by the second lever and being manually adjustable to vary the spacing between the abutment and the opposite end of the first lever. This arrangement facilitates calibration of the control system.

According to yet another feature of the invention the control system comprises memory means for storing information received from the sensor. This feature houses operational flexibility of the system.

According to a further feature of the invention, the second lever comprises a cam surface moved during the pivotal movement of the second lever; and the system includes a cam follower and a switch responsive thereto, the cam follower being shaped and arranged to actuate the switch in response to movement of the second lever into either of two oppositely directed angular positions. This arrangement provides output signals representing idle and full open positions of the fuel supply means.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
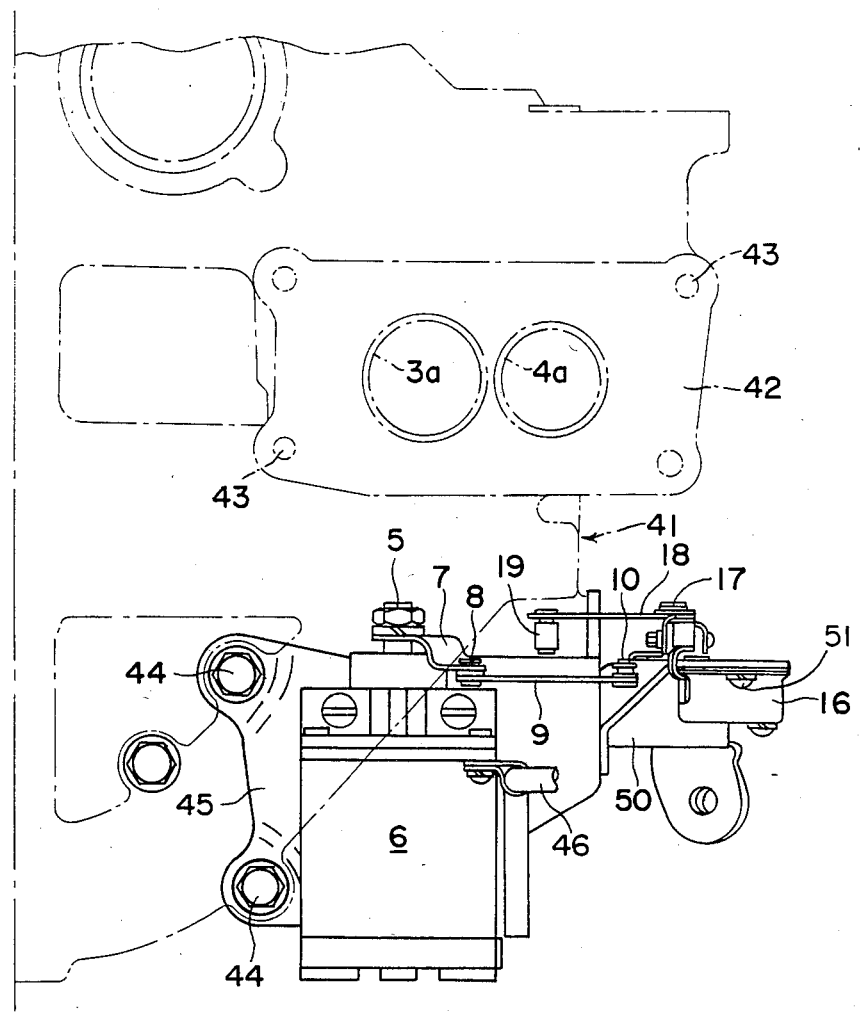
FIG. 1 is a schematic plan view according to the invention of a fuel control system on the intake manifold of an internal combustion engine.

Schematically shown in FIG. 1 is a four-cylinder engine. An intake manifold 41 is provided with a flat mounting surface 42 for mounting a carburetor (not shown). Provided in the surface 42 are air openings 3a and 4a, and bolt holes 43. A bracket 45 is secured to the intake manifold 41 by a bolt 44 and in turn supports a stepping motor 6. Connected to the stepping motor 6 by a lead wire 46 is an electronic control unit that will be described hereinafter.

Figure 2:
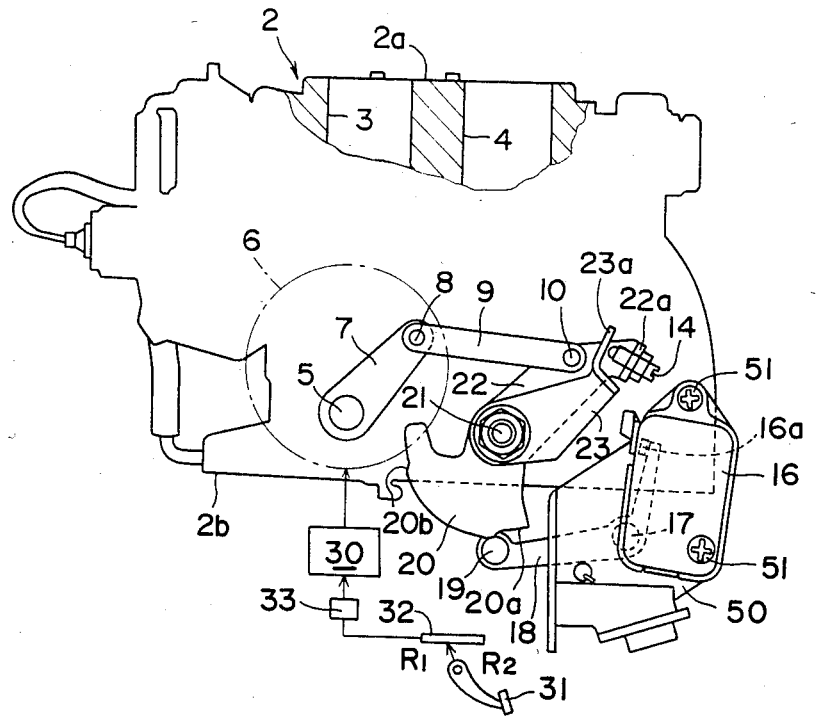
FIG. 2 is a schematic front elevation view of the control system.

Referring to FIG. 2, a bottom surface 2b of a carburetor 2 is mounted on the surface 42 of the said intake manifold 41. The carburetor 2 includes a top surface 2a on which is installed an air cleaner (not shown). In addition, a primary air passage 4 communicates with the air opening 4a and a secondary air passage 3 communicates with the air opening 3a.

A conventional throttle valve with a valve shaft 21 regulates the supply of mixed gas or fuel taken into cylinders of the said internal combustion engine through the primary air passage 4. Opening of the throttle valve is controlled by the stepping drive motor 6 in response to operation of an accelerator pedal 31. The valve shaft 21 is fixed for pivotal movement with one end of a first operating lever 23 that is biased by a return spring (not shown) in an idle position.

Coupling an opposite end of the first operating lever 3 to one end of a second lever 22 is a coupling composed of a transverse lip 22a formed on the one end of the second lever 22 and an adjusting bolt 14 threadedly engaging the lip 22a. The bolt 14 is arranged to abut a transverse lip 23a on the opposite end of the first operating lever 23. An opposite end of the second operating lever 22 is freely mounted for pivotal movement on the valve shaft 21. Connecting the one end of the second lever 22 with one end of a linkage 9 is a pin 10. The other end of the linkage 9 is connected by a pin 8 with an arm 7 fixed to a spindle 5 of the stepping motor 6 which houses a reduction gear.

The stepping motor 6 receives control signals delivered from an electronic control unit 30. The control signals include signals representing operating positions of the accelerator pedal 31. Those positions include an idle position and a fuel maximum position or full open position of the throttle valve. In order to produce the control signals, there is coupled to the accelerator pedal 31 an accelerator sensor 32 which consists of a potentiometer for providing resistance change in response to accelerator operation. The resistance change is input in a fashion of digital signals to the electronic control unit 30 by an analog-digital convertor 33. Also applied to the electronic control unit 30 are digital signals indicating a starting state of the vehicle, a speed change gear condition, and an operational state of a clutch mechanism.

Figure 3:
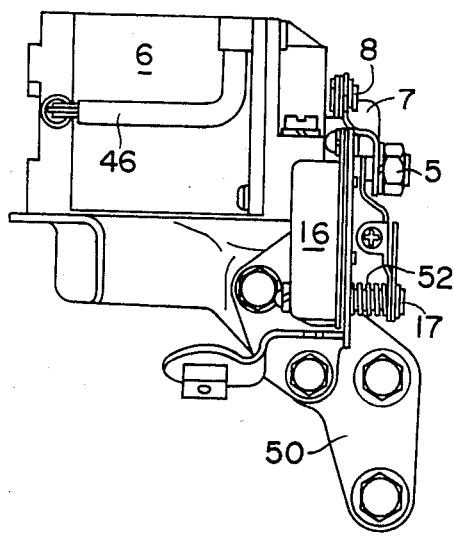
FIG. 3 is a schematic view of the control system.

In order to detect the idle and full open positions of the throttle valve, a fan-shaped cam surface 20 is formed on the opposite end of the second lever 22. Both ends of the cam surface 20 have concave portions 20a and 20b for actuating a switch 16 as will be described hereinafter. The cam surface 20 is fitted to a cam follower roller 19 mounted on a bell crank 18. Pivotally supporting the bell crank 18 from a bracket 50 is a supporting shaft 17. The bracket 50 is fixed to the intake manifold 41 shown in FIG. 1. Also supported to the bracket 50 by bolts 51 is the switch 16. An extended end of the bell crank 18 opposite to the roller 19 supports a contact 16a of the switch 16. The bell crank 18 is biased to turn normally clockwise (in FIG. 2) by a spring 52 (shown in FIG. 3) wound on the supporting shaft 17.

OPERATION

Figure 4:
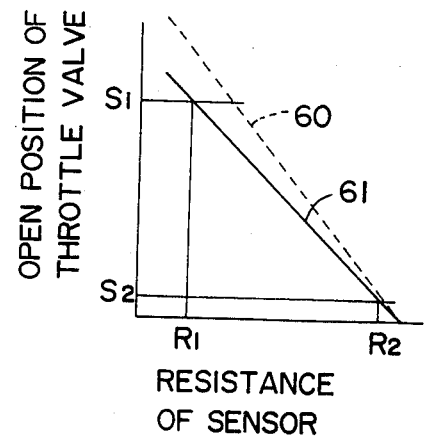
FIG. 4 is a diagram illustrating the operational characteristics of the control system shown in FIGS. 1-3.

As illustrated by a characteristic line 61 in FIG. 4, the accelerator sensor 32 is preset so as to provide a maximum resistance when the accelerator pedal 31 is released, or in an idle position, and a zero resistance when the accelerator pedal 31 is fully pressed. During usual driving, the stepping motor 6 is driven in proportion to a resistance change of the accelerator sensor 32. The resistance change is determined by angular position of the accelerator pedal 31 which thereby controls opening of the throttle valve. If the accelerator pedal 31 is pressed a little from a released or idle position thereof, a signal delivered from the electronic control unit 30 prompts the stepping motor 6 to drive the throttle valve toward open in the following manner.

The second lever 22 is pivoted counterclockwise around the valve shaft 21 (in FIG. 2), and forcible engagement between the adjusting bolt 14 and the lip 23a of the first lever 23 produces common counterclockwise movement thereof. The first lever 23 in turn causes the throttle valve to open a little from the idle position. Simultaneously, movement of the second lever 22 out of its idle angular position causes the cam surface 20 to force the roller 19 out of the concave region 20a. This causes the bell crank 18 to turn counterclockwise around a center of the supporting shaft 17, thereby closing the contact 16a. Until the switch 16 is closed at the first operating point S1 thereof, a signal representing the idle position of the throttle valve is input to the electronic control unit 30. As illustrated in FIG. 4, a number of steps of the stepping motor 6 are required to reach the first operating point S1 of the switch 16. Those steps are counted and stored as the idle position in the memory of the electronic control unit 30. As the resistance of the sensor 32 changes from R1 toward R2 which corresponds to the full open position of the throttle valve, the stepping motor 6 is driven by a number of steps proportional to the change of resistance, thereby increasing the opening of the throttle valve. With the accelerator pedal 31 depressed to produce a sensor output R2, the driving lever 22 has been moved by the stepping motor 6 into an angular position that engages the concave surface 20b with the cam follower 19 thereby again opening the contact 16a of the switch 16. At this second operating position S2, a signal is developed that prevents the application of a stepping signal from the electronic control unit 30 to the stepping motor 6. Thus, further depression of the accelerator pedal 31 will produce no further revolvement of the stepping motor 6.

As described above, the revolutional angle of the stepping motor 6 is controlled by actuation of the accelerator pedal 31 in a movable range of the throttle valve; i.e. from the idle position to the full open position. That control is provided by two switching signals: one is an 'on' switching signal produced at the first operating point S1 of the switch 16 for detecting the idle position of the throttle valve and the other is an 'off' switching signal produced at the second operating point S2 of the switch 16 for detecting the full open position of the throttle valve.

In this invention, the operating or first lever 23 that is interlocked with the throttle valve and the driving or second lever 22 that is interlocked with the stepping motor 6 are arranged for either common or independent movement. When the internal combustion engine is started and the accelerator pedal 31 is pressed, the stepping motor 6 first produces pivotal movement of the second operating lever 22 until its abuts the first lever 23 after which common pivotal movement of both the first and second levers 22 and 23 opens the throttle valve. Therefore, the stepping motor 6 will not cause a malfunction of an automatic choke mechanism or the like upon starting the internal combustion engine in cold weather. Further, when the throttle valve is moved from the idle position, a signal valve representing a number of steps given to the stepping motor 6 is stored in the memory of the electronic control unit 30. Subsequently, the angular position of the stepping motor 6 can be controlled in terms of a difference between that stored signal valve and a signal valve representing a number of steps later detected by the accelerator sensor 32. Therefore, even if a replacement potentiometer accelerator sensor 32 has a different resistance characteristic, as shown by the lines 60 and 61 in FIG. 4, no change will occur in the idle position of the throttle valve. This feature facilitates very easy initial positional setting of the accelerator sensor 32 and the accelerator pedal 31. Furthermore, this invention provides an advantage that a deviation from the idle position of the throttle valve and the first operating point S1 of the switch 16 can be easily adjusted by the adjusting bolt 14.

Obviously, many modifications and variations of the present invention are possible in light of the above teachings. For example, although the embodiment described utilizes a throttle valve for the carburetor as a fuel control device, the invention also can be used with a fuel injection pump. In that cae, a control lever coupled to the fuel injection pump can be actuated by the second lever 22, thus providing an effect similar to the one stated above. It is to be understood, therefore, that the invention can be practiced otherwise than as specifically described.

What is claimed is:

1. An internal combustion engine fuel control system comprising:
    fuel supply means for controlling the supply of fuel to an internal combustion engine;
    a first operator means mechanically coupled to said supply means and operative to adjust the level of fuel supplied thereby;
    a second operator means;
    sensor means for sensing the position of a manually actuated accelerator pedal for the engine;
    control means responsive to said sensor means and providing an output dependent upon the accelerator position sensed thereby;
    driving means responsive to said control means and producing a degree of movement of said second operator means dependent upon said output of said control means; and
    coupling means mechanically coupling said first and second operator means so as to alternatively provide either common or independent movement thereof; said coupling means permitting a predetermined degree of independent movement of said second operator means in response to initial actuation of the pedal and coupling said first and second operator means so as to produce common movement thereof in response to further actuation of the pedal.

2. A system according to claim 1 wherein said fuel supply means comprises a rotatable shaft, and said first operator means is fixed to for rotation therewith.

3. A system according to claim 2 wherein said first operator comprises a first lever having one end fixed to said shaft, and said second operator comprises a second lever having one end coupled to an opposite end of said first lever by said coupling means.

4. A system according to claim 3 wherein said coupling means is adapted to permit one sense of pivotal movement by said first lever independently of said second lever and to produce said movement of said first lever in response to pivotal movement of said one sense by said second lever, and including bias means inducing pivotal movement of said first lever in a sense opposite said one sense.

5. A system according to claim 4 wherein an opposite end of said second lever is freely mounted for pivotal movement on said shaft.

6. A system according to claim 5 wherein said coupling comprises an abutment surface on said one end of said second lever, said abutment surface shaped and arranged to engage said opposite end of said first lever in response to pivotal movement of said one sense by said second lever.

7. A system according to claim 6 wherein said coupling comprises adjustment means manually adjustable to vary the spacing between said abutment surface and said opposite end of said first lever.

8. A system according to claim 7 wherein said adjustment means comprises a threaded coupling.

9. A system according to claim 8 wherein said threaded coupling couples said abutment surface to said one end of said second lever.

10. A system according to claim 3 wherein said drive means comprises an electrical stepping motor responsive to said control means and operatively coupled to said second lever so as to produce pivotal movement thereof.

11. A system according to claim 10 wherein said coupling means is adapted to permit one sense of pivotal movement by said first lever independently of said second lever and to produce said movement of said first lever in response to pivotal movement of said one sense by said second lever, and including bias means inducing pivotal movement of said first lever in a sense opposite said one sense.

12. A system according to claim 11 wherein an opposite end of said second lever is freely mounted for pivotal movement on said shaft.

13. A system according to claim 12 wherein said coupling comprises an abutment surface on said one end of said second lever, said abutment surface shaped and arranged to engage said opposite end of said first lever in response to pivotal movement of said one sense by said second lever.

14. A system according to claim 13 wherein said coupling comprises adjustment means manually adjustable to vary the spacing between said abutment surface and said opposite end of said first lever.

15. A system according to claim 14 wherein said adjustment means comprises a threaded coupling.

16. A system according to claim 10 wherein said control means comprises memory means for storing information received from said sensor means.

17. A system according to claim 16 wherein said coupling means is adapted to permit one sense of pivotal movement by said first lever independently of said second lever and to produce said movement of said first lever in response to pivotal movement of said one sense by said second lever, and including bias means inducing pivotal movement of said first lever in a sense opposite said one sense.

18. A system according to claim 17 wherein an opposite end of said second lever is freely mounted for pivotal movement on said shaft.

19. A system according to claim 18 wherein said coupling comprises an abutment surface on said one end of said second lever, said abutment surface shaped and arranged to engage said opposite end of said first lever in response to pivotal movement of said one sense by said second lever, said coupling comprises adjustment means manually adjustable to vary the spacing between said abutment surface and said opposite end of said first lever.

20. A system according to claim 3 wherein said second lever comprises a cam surface moved during said pivotal movement of said second lever; and including a cam follower means and a switch means responsive thereto, said cam follower shaped and arranged to actuate said switch means in response to movement of said second lever into either of two oppositely directed angular positions.

* * * * *